Frank A. Ferguson INVENTOR.
BY P. L. Young
ATTORNEY.

Jan. 12, 1943.  F. A. FERGUSON  2,308,163
CONCENTRATION OF PETROLEUM SLUDGE ACID
Filed Dec. 27, 1939  2 Sheets-Sheet 2

Frank A. Ferguson INVENTOR.
BY
P. L. Young ATTORNEY.

Patented Jan. 12, 1943

2,308,163

UNITED STATES PATENT OFFICE 2,308,163

CONCENTRATION OF PETROLEUM SLUDGE ACID

Frank A. Ferguson, Baytown, Tex., assignor to Standard Oil Development Company, a corporation of Delaware Application December 27, 1939, Serial No. 311,071

4 Claims. (Cl. 23—307)

The present invention is directed to a method and apparatus for the recovery of concentrated sulphuric acid from petroleum acid sludges.

In the refining of petroleum, many different types of petroleum are subjected to treatment with concentrated sulphuric acid. Such treatments result in the formation of sludges which contain sulphuric acid, sulphuric esters of organic compounds, sulphonic acids, and organic constituents. In every case, the sludge is first subjected to hydrolysis which serves to break up the esters and effect a separation between organic compounds and dilute sulphuric acid. As a result of this hydrolysis step, weak sulphuric acid containing organic matter is recovered. The amount of carbon contained in said weak acid varies with the type of treatment from which the sludge was recovered, as well as from the type of stock which was treated. In some cases this carbon content may be as low as one percent, while in other cases it may be as high as eight or nine percent by weight. It is to the recovery of concentrated acid from such weak carbon containing acids that the present invention is directed.

In the past, two general methods of recovery of concentrated acid from these weak carbon containing acids have been practiced. One of these methods is the hot air submergence or tower method, and the other is commonly referred to as the drum type. In the former, weak acid is passed successively downwardly through towers packed with brick countercurrent to an upwardly flowing stream of hot gas. The acid recovered from the first tower is fed into the top of the second tower. Due to the effect of heat on the organic constituents contained in the weak acid, this method results in severe coking of the tower with the consequence that the towers have to be shut down frequently for cleaning.

In the drum type method the acid is passed through two or more drums in series countercurrent to a flow of gas. The hottest gas is fed to the last drum in the series and passes successively to the preceding drum so that the weakest acid comes in contact with the coolest gas. In this method also severe coking has been encountered in the higher temperature drums.

The principal object of the present invention is the provision of a method and apparatus of the type described in which coking troubles are minimized without any sacrifice of throughput, but on the contrary with an increase in throughput.

More specifically, it is an object of the present invention to provide a method of the character described which is divided into separate stages so controlled that the bulk of the carbon is precipitated in one stage in a granular form in which it is readily separable from the acid.

Briefly, the method of the present invention is a combination of the drum type method with a modified tower method. In general, the same flow of hot gases is maintained throughout the drums and the towers in the practice of the present invention as was maintained in these methods as they were formerly known. That is to say, in the drums the hottest gas enters the drum having the more concentrated acid and passes then to the drums having weaker acid, while in the towers, gas of the same temperature is fed to individual towers simultaneously. The unique feature is the interposition of the towers between successive drum stages. In other words, the weak acid is first fed into the low temperature drum and then successively to two or more towers and then into the high temperature drum. In the low temperature drum the acid is relieved of some of its water and serves the purpose of cooling the gases leaving the high temperature drum to a point where they can be safely fed to a Cottrell precipitator. In the first tower the acid is further dehydrated and brought up to decarbonizing temperature. In the second tower the acid is decarbonized and still further concentrated. In the second drum the final concentration occurs. The decarbonizing stage may also be referred to as the cleaning stage, since it is between this stage and the final concentrating stage that the granular carbon formed in the decarbonizing stage is skimmed off from the acid.

An additional feature of novelty of the present invention resides in the feeding of the acid to the decarbonizing stage concurrently with the hot gas introduced into this stage. To put it another way, the acid fed to the decarbonizing stage is introduced into this stage at the point where the hot gases are at their highest temperature, namely, at the point of entry of the hot gases.

Other novel features and advantages of the present invention will appear from the following detailed description of the accompanying drawings in which—

Figure 1:
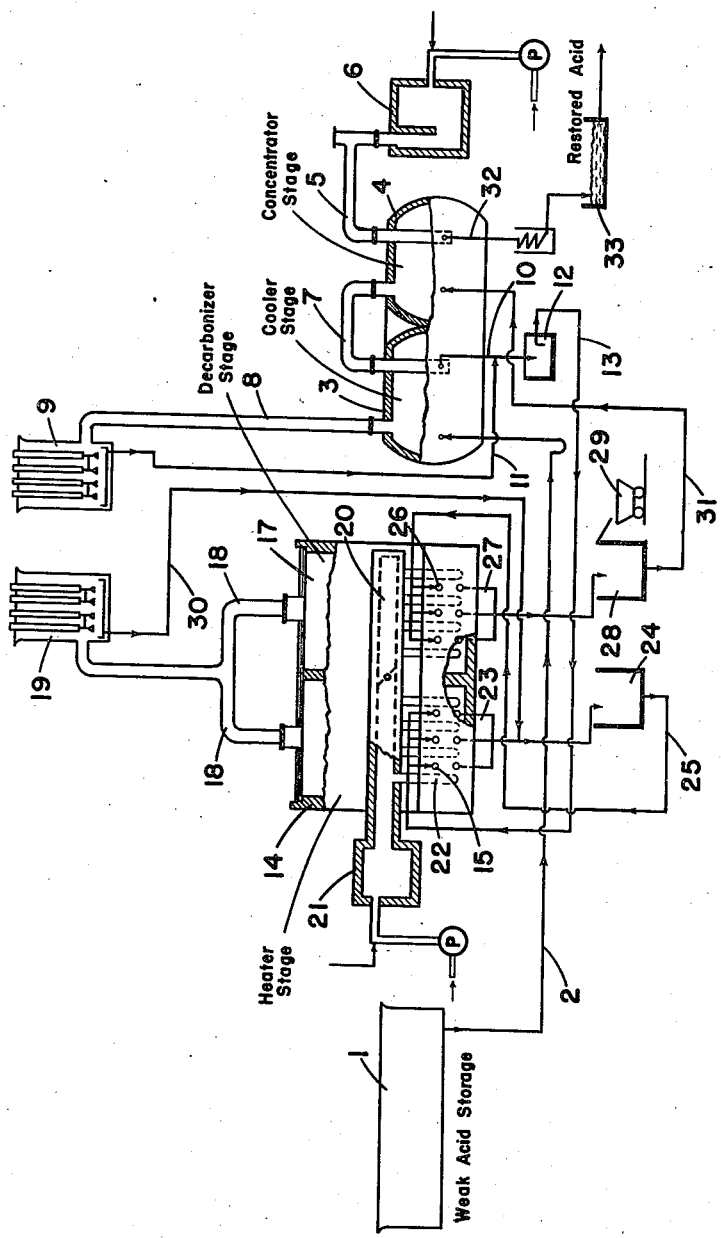
Figure 1 is a front elevation, partly in section, of an apparatus suitable for carrying out the method of the present invention.
Figure 2:
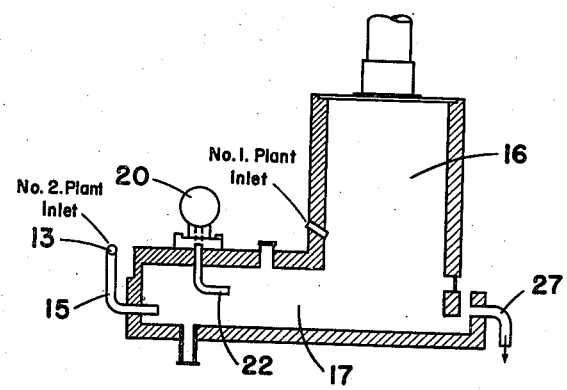
Figure 2 is a vertical section through one of the towers shown in Figure 1.

Referring in detail, to the drawings, in which like parts in the several figures are designated by the same numerals, numeral 1 designates a storage tank for weak acid in which is provided a drawoff line 2 which conveys the weak acid to a tank 3, which is arranged side by side with a similar tank 4. Through line 5 the latter tank is fed with hot gases from a furnace 6, these gases being introduced near the bottom of tank 4. These gases are conducted from the top of tank 4 to the bottom of tank 3 by a pipe 7 and leave the top of tank 3 by a pipe 8 by which they are conveyed to a Cottrell precipitator 9. Tank 3 is provided with an acid drawoff line 10 which has a branch line 11 connected to the Cottrell precipitator and which empties into a pot 12 from which acid is withdrawn by a pipe 13. Pipe 13 terminates in a header arranged parallel to the front of a tower 14 and is provided with a plurality of feed lines 15 which empty into the bottom of the tower 14. It will be noted that this tower has a relatively large bottom section and an upper stack section 16 neither one of which is packed. Tower 14 constitutes half of a battery the other half of which is a tower 17 of identical construction. Each of these towers has an exhaust pipe 18 at its top, these pipes converging into a single pipe and discharging into a Cottrell precipitator 19.

Arranged across the front of the towers 14 and 17 is a manifold 20 which is fed with hot gases from furnace 21. Manifold 20 is provided with a number of feed tubes 22, a plurality of which discharge into each of towers 14 and 17 near the bottom thereof. The acid from line 13 is fed into the front of tower 14 and withdrawn from the rear thereof by drawoff pipe 23 which discharges into a pot 24, from which the acid is withdrawn by a line 25 which also terminates in a header provided with branch lines 26, a plurality of which discharge into the front of tower 17. At this point it is important to note that the lines 26 discharge into tower 17 directly behind the feed line 22 for hot gas. The same arrangement has been shown in tower 14, but it is particularly important with respect to tower 17, as will be hereinafter explained. The acid is drawn off from the rear of tower 17 by lines 27 which discharge into a pot 28. In this pot granular coke rises to the surface and is skimmed off into a cart 29.

The acid is drawn off from pot 28 by line 31 which discharges into drum 4 from which the acid is withdrawn by line 32, which discharges into a storage tank 33.

For a clear understanding of the method, let it be assumed that the acid in tank 1 is 30° Bé. acid. Hot gas at 1100° F. is fed into tank 4 and leaves this tank through line 7 at a temperature above 410° F. It leaves drum 3 through line 8 at a temperature of about 260° F. The acid leaving drum 3 is at a temperature of about 180° F. and is 35° Bé. gravity.

Towers 14 and 17 are each supplied with hot gas at a temperature of 1100° F. The acid leaving tower 14 is at a temperature of from 180–200° F. and is 38–44° Bé. gravity. In tower 17 it is important that the amount of hot gas fed, as well as the acid flow, be regulated so that the acid will leave the tower at a gravity of between 50 and 58° Bé., and at a temperature between about 240 and 275° F. If insufficient gas, or gas not at a sufficiently high temperature, is employed, the carbon will separate in tower 17 as a gummy mass which gives difficulty in separation. On the other hand, if too much gas or too hot a gas is supplied, the acid in tower 17 will froth, and some of this froth will be carried up to the precipitator. To take care of such entrained acids, the precipitator 19 is provided with a drainage line 30 which discharges into pot 24.

The acid enters the final concentration drum 4 having a gravity between 50° and 58° Bé. It leaves this drum with a gravity between 65° and 66° Bé. and at a temperature between 400° and 410° F. As shown in the drawings, the drawoff line 32 is provided with a cooler whereby the acid may be brought down to any desired temperature before it is placed in storage.

In this method, the operation in drum 3 is referred to as the cooler stage; that in tower 14 is referred to as the heater stage; that in tower 17 is referred to as the decarbonizer or cleaner stage; and that in drum 4 is referred to as the concentrating stage. It will be noted that the towers have no interior packing and that the acid in these towers, unlike the well known tower operations, does not flow countercurrent to the hot gases, but is merely fed into the bottom of the towers to a predetermined level above the point of introduction of the hot gases.

The method of the present invention is capable of extremely long periods of operation without any shutdown for cleaning purposes. Where the previously known methods could be conducted continuously for a period of from four to ten days without a shutdown for cleaning, the method of the present invention has run for as long as sixty days without a shutdown. The manner in which the acid and hot gases are fed into tower 17 has contributed considerably to the length of period of operation without shutdown. The exact reason for this is not known, but it may be postulated that the sudden contact of the acid with the very hot gases effects a more or less complete conversion of the organic matter in the acid to granular coke.

Figure 3:
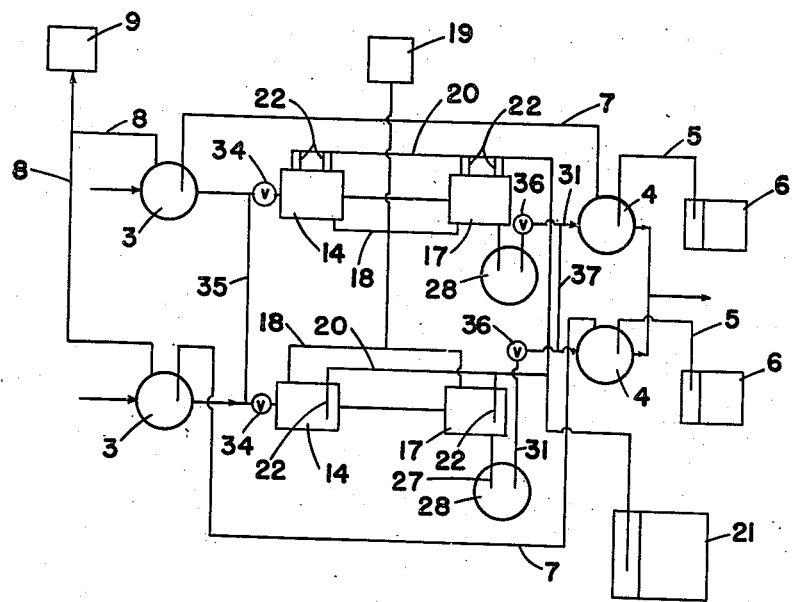
Figure 3 is a plan view showing a unit for continuous operation.

In Figure 3 is shown an arrangement which is used in practice for continuous operation. This arrangement actually consists of two complete plants having two drums 3, two drums 4, two towers 14 and two towers 17. The feed line from each drum 3 to its corresponding tower 14 is provided with a valve 34, and these lines are connected by a branch 35, whereby the feed from both drums can be discharged into either tower 14. Likewise, each line 31 is provided with a valve 36 and these lines are connected behind the valve by a line 37 so that the acid drawn off from either pot 28 may be passed through both drums 4.

In operation the plant consists of two drums 3, a tower 14, a tower 17, and two drums 5. As each series of towers becomes coked up, it is taken off stream and the other series put on stream. The arrangement shown seems to effect a marked, although not generally explainable, increase in the capacity of the plant. For example, in a typical unit of the type shown in Figure 3, the rated capacity of the plant, based on the capacity of the individual units, was eighty tons per day. The actual running capacity of the plant was from one hundred and ten to one hundred and fifteen tons per day. Moreover, the rated capacity was based on concentration of acid containing not more than one percent of carbon, by weight, whereas, in actual practice, the acid treated, contained more than four percent of carbon by weight.

It will be understood that variations can be made in the apparatus and procedure described without departing from the scope of the present invention. It is particularly emphasized that the temperature and degrees of concentrations given are purely for illustrative purposes, and that they can be changed to meet the nature of the sludge being treated as well as the final desired gravity of the acid. As can be observed, the cooler stage is not an essential stage of the method of the present invention but is included for the sake of expediency to avoid the necessity for using independent means for cooling the hot gases from drum 4.

The nature and objects of the present invention having been thus described and illustrated, what is claimed as new and useful and is desired to be secured by Letters Patent is:

1. A method for concentrating dilute sulfuric acid containing carbonaceous material which comprises establishing a pool of the acid to be concentrated, then feeding the dilute acid concurrently with hot gases into said pool below the surface thereof and in close proximity to each other whereby the incoming acid contacts the hottest gases first, and maintaining said acid in said zone for such a period of time as to raise the concentration of the acid to a value between 50° and 58° Bé., to thereby convert the carbonaceous material contained in said acid into granular form, separating the granular carbon from the acid resulting from this stage and finally concentrating the acid to the desired degree by the application of heat.

2. A method for concentrating a dilute sulfuric acid containing carbonaceous material which comprises preliminarily heating and concentrating said acid, subsequently feeding the heated partly concentrated acid concurrrently with hot gases into a pool of acid in a concentrating zone below the surface thereof and in close proximity to each other whereby the incoming acid comes into contact with the hottest gases first, maintaining said acid in the concentrating zone at a temperature no greater than 275° F. for such a period of time as to raise the concentration of the acid to a value between 50 and 58° Baumé to thereby convert the carbonaceous material contained in said acid into granular form, separating the granular carbon from the acid resulting from this stage, and subsequently subjecting the acid to another concentrating step.

3. In a method for concentrating sulfuric acid containing carbonaceous material in which the sulfuric acid is stripped with hot gases, the steps of establishing a pool of acid in a stripping zone and feeding sulfuric acid and hot gases concurrently into said pool below the surface thereof and in close proximity to each other, whereby the incoming acid contacts the hottest gas first to thereby convert the carbonaceous material in said acid into granular form.

4. An apparatus for concentrating sulfuric acid containing carbonaceous material comprising a vessel, means for maintaining a liquid level in said vessel, an inlet for acid in said vessel to introduce acid below said liquid level, a separate inlet for hot gas in said vessel arranged adjacent said acid inlet in a position to introduce gas into said vessel below said liquid level and in close proximity to the point of inlet of said acid whereby the latter contacts the hottest gas first, and an outlet for acid from said vessel.

FRANK A. FERGUSON.